March 27, 1945. E. EGER 2,372,560
VALVE MECHANISM
Filed Sept. 28, 1932

INVENTOR
ERNST EGER
BY
ATTORNEY

Patented Mar. 27, 1945

2,372,560

UNITED STATES PATENT OFFICE 2,372,560

VALVE MECHANISM

Ernst Eger, Grosse Pointe Park, Mich., assignor, by mesne assignments, to United States Rubber Company, New York, N. Y., a corporation of New Jersey Application September 28, 1932, Serial No. 635,209

4 Claims. (Cl. 251—144)

My invention relates to valve mechanisms, and in particular to valve insides intended to be used in connection with valves for inner tubes of pneumatic tires. More particularly, the present invention is adaptable to that type of stem known as the "all rubber" valve stem.

Conventional types of valve insides generally provide a seat for the valve mechanisms, independent of the seat which admits and releases air to or from the inner tube. In the conventional type valve insides, leakage frequently occurs at the seat which forms the seal between the valve stem and the valve mechanism or core. In my invention, I provide only one valve seat, thus eliminating the usual cause of leakage.

Commercial use of the all rubber valve stem has required that the valve mechanism should be relatively short due to the flexibility of the stem. I provide a valve mechanism which does not extend into the bore of the free flexing portion of the stem, but is confined within a short metallic cap positioned at the end of the valve stem.

I also provide a valve stem which, in addition to its adaptability to the present valve mechanism, if properly proportioned, is also adaptable to conventional valve mechanisms. This interchangeability is of considerable importance where a new product is placed in the commercial field.

Further objects of my invention are to decrease the number of parts which make up the mechanism, and to eliminate sealing gaskets. A further object is to provide a valve inside which is more compact, simple in construction, and more economically manufactured.

Other objects and advantages become apparent in the following detailed description when considered in connection with the accompanying drawing, in which.

Figure 2:
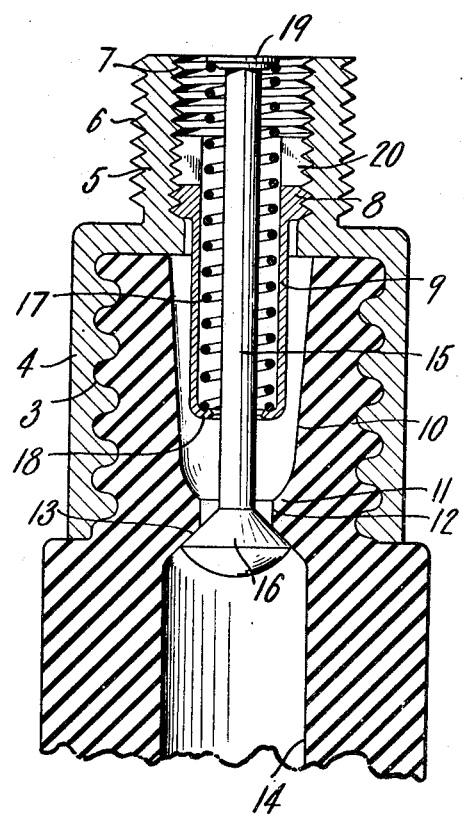
Fig. 2 is a greatly enlarged elevational view, in section, of the upper part of the stem and valve mechanism.

Referring to the drawing, the numeral 1 indicates a valve stem having a base 2. The stem 1 is preferably composed of flexible material, such as rubber with or without fibrous or fabric reinforcement, although certain features of the invention are applicable to metallic valve stems. The top of the stem 1 is provided with coarse threads 3 (Fig. 2) upon which a cap or sleeve 4 is attached. This cap 4 is attached to the rubber stem by being folded and vulcanized thereon. As shown in the drawing, the bond between the metal cap 4 and the stem 1 need not be air tight for the reason that this union has no connection with the stem passageway or bore in which the fluid pressure is confined. Therefore, the bond need only be sufficient to retain the cap 4 in its relative position with the stem 1. In conventional rubber valve stems it is a general practice to provide a short nipple at the end of the rubber stem, which extends internally of the stem so as to provide in part a continuation of the stem bore. This condition is objectionable in that the joint between the nipple and the rubber stem communicates directly with the stem aperture, thus requiring a good bonding condition between the rubber and metallic members. This undesirable condition is entirely overcome by my invention. Continuing or projecting from the top of sleeve 4 is an extension sleeve 5 which has external threads 6 upon which may be screwed a conventional type of valve cap (not shown). The extension sleeve 5 has internal threads 7 in which a threaded end 8 of a spring retainer sleeve 9 is retained. A recess 10 forming an axially aligned chamber in the upper part of the stem 1 provides a clearance for the insertion of the spring retainer sleeve 9. The bottom of the recess 10 narrows inwardly to form a shoulder 11 and an aperture 12. A valve seat 13 is formed as a conical lower or inner surface of the shoulder 11 converging towards the aperture 12 and opening at its base to bore 14 of the valve stem. The valve seat 13 is disposed sufficiently within the lower portion of the cap 4 so that the latter serves to reinforce it against outward radial distension when under sealing pressure.

Figure 1:
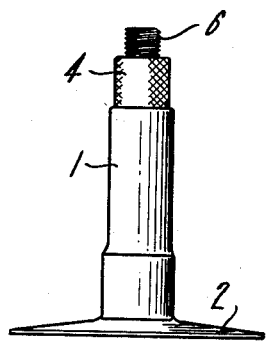
Fig. 1 is a side elevational view of the complete valve stem.
Figure 3:
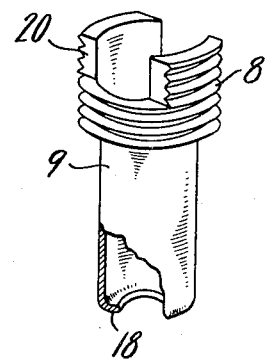
Fig. 3 is a perspective view, partly in section, of the spring retainer sleeve.

The working parts of the valve mechanism comprise a valve pin 15 flared out at the bottom to form a conical valve head 16. A spring 17 is retained at the lower end by a rim 18 extending radially inwardly of the spring retainer sleeve 9. The upper end of the spring 17 engages with a spring retaining flange 19 at the uppermost part of the valve pin 15. The spring as thus assembled normally urges the valve pin 15 in an upward or outward direction so that the valve head 16 will fit tightly against the seat 13. As customary with valve insides, the threaded end 8 of the spring retainer sleeve 9 is provided with flat surfaces 20 (Fig. 3) for engagement with a conventional valve cap tool.

In rubber valve stems it is of considerable importance that the valve mechanism should be relatively short. The reason for this is that a long valve mechanism will interfere with the free flexing of the stem, and at the same time any flexing of the stem will interfere with the proper sealing function of the valve mechanism. This condition is entirely overcome by my invention in which I provide a valve mechanism confined substantially within the length of the metal cap at the end of the all rubber stem, the cap 4 also serving to prevent outward radial distension of the valve seat 13 when the latter is under sealing pressure.

The narrow aperture 12 is of such size that the valve head 16 cannot normally pass therethrough. Due, however, to the flexible material of the stem 1, the valve head when inserted and given a firm downward pressure will cause the aperture 12 to distend sufficiently so that the valve head 16 may pass therethrough. A lubricant, such as water, applied to the wall of aperture 12 or to the surface of the valve head 16 greatly facilitates the inserting operation.

After the valve mechanism is in proper actuating position, the pressure which the valve is designed to withstand is not sufficient, when reacting against the valve head 16, to cause the aperture 12 to distend. The seat 13 as provided in my invention is part of the all rubber stem itself, and forms a thick and substantial body for contact engagement with the valve head. This presents a further advantage for the reason that the small, thin sheet of rubber embodied in conventional valve mechanisms is more susceptible to deterioration due to its comparatively localized compression.

Although a preferred embodiment of the invention has been illustrated and described herein, it is obvious that various modifications may be made without departing from the spirit and scope of the following claims.

Having thus described my invention, what I claim and desire to protect by Letters Patent is:

1. In a valve assembly, a tubular valve casing of flexible material having an internal restriction constituting a valve seat, a ferrule secured externally of said casing and terminating in the zone of said restriction to serve as a reenforcement therefor, a co-operating valve member movable in said casing for engaging said restriction, a valve stem for said valve member extending into said casing past the restriction to draw the valve member against the restriction, and a resilient connection between the valve stem and ferrule.

2. In a valve assembly, a tubular valve casing of flexible material having an internal restriction constituting a valve seat, a ferrule secured externally of said casing and terminating in alignment with said restriction to serve as a reenforcement therefor, a co-operating valve member movable in said casing for engaging said restriction, a valve stem for said valve member extending into said casing past the restriction to draw the valve member against the restriction, and a resilient connection between the valve stem and ferrule, whereby the metallic parts of the assembly are substantially confined within the ferrule and the flexibility of the remainder of the stem is unimpaired.

3. In a valve assembly, a tubular valve casing of flexible material having an internal restriction constituting a valve seat, a ferrule secured externally of said casing and terminating in the zone of said restriction to serve as a reenforcement therefor, a co-operating valve member movable in said casing for engaging said restriction, a valve stem for said valve member extending into said casing past the restriction to draw the valve member against the restriction, a sleeve secured internally of the ferrule and the end of the casing and loosely enclosing a portion of the valve stem, and a spring interposed between the sleeve and stem for urging the valve member into engagement with the restriction.

4. A valve assembly comprising a tubular valve casing of flexible material capable of considerable bending or flexing, means at one end of said casing for securing the casing to an inner tube, the material of said casing having a restriction near the end of the casing remote from the securing means, means secured near the latter end of said casing beyond said restriction with a portion outside of and reinforcing the restriction and enclosing said latter casing end for anchoring a valve stem, a valve stem extending past said restriction, a valve member attached to the inner end of said stem, and resilient means interposed between the stem and anchoring means for urging the valve member into engagement with the restriction whereby the major portion of the casing is free from valve parts.

ERNST EGER.